(12) United States Patent
Hsieh

(10) Patent No.: US 9,434,399 B2
(45) Date of Patent: Sep. 6, 2016

(54) FASTENING BELT STRUCTURE FOR A TROLLEY

(71) Applicant: Hando Industrial Co., Ltd., Yuanlin Township, Chang Hua County (TW)

(72) Inventor: Hung-Hsin Hsieh, Yuanlin Township (TW)

(73) Assignee: Hando Industrial Co., Ltd., Yuanlin Township (TW)

( * ) Notice: Subject to any disclaimer, the term of this patent is extended or adjusted under 35 U.S.C. 154(b) by 0 days.

(21) Appl. No.: 14/733,994

(22) Filed: Jun. 9, 2015

(65) Prior Publication Data

US 2016/0068175 A1    Mar. 10, 2016

(30) Foreign Application Priority Data

Sep. 4, 2014   (TW) .............................. 103215838 U

(51) Int. Cl.
*B60P 7/08*      (2006.01)
*B62B 1/10*      (2006.01)

(52) U.S. Cl.
CPC ................ *B62B 1/10* (2013.01); *B60P 7/0823* (2013.01)

(58) Field of Classification Search
CPC ............................... B60P 7/0823; B62B 1/10
USPC ............... 410/51, 97, 100; 280/47.27; 298/2
See application file for complete search history.

(56) References Cited

U.S. PATENT DOCUMENTS

| | | | | |
|---|---|---|---|---|
| 5,137,403 A | * | 8/1992 | McCaffrey | B60P 7/0823 410/51 |
| 8,496,417 B1 | * | 7/2013 | Yang | B60P 7/083 410/51 |

* cited by examiner

*Primary Examiner* — Stephen Gordon
(74) *Attorney, Agent, or Firm* — Alan D. Kamrath; Kamrath IP Lawfirm, P.A.

(57) ABSTRACT

A fastening belt structure for a trolley contains: a first body, a second body, and a third body. The first body includes a female buckle disposed on a first end thereof and its second end mounted on a support post of a first side of the trolley. The second body includes a male buckle fixed on a first end thereof and an engagement unit secured on a second end thereof. The third body includes a first end coupled with a support post of a second side of the trolley and includes a second end inserted through the engagement unit and being a tail segment. The engagement unit includes a connection portion for connecting with the second body, a stopping plate, a first recess and a second recess which are configured to insert the third body, and an engaging plate rotatably coupled with the second recess.

3 Claims, 7 Drawing Sheets

FASTENING BELT STRUCTURE FOR A TROLLEY

BACKGROUND OF THE INVENTION

1. Field of the Invention

The present invention relates to a fastening belt structure, and more particularly to the fastening belt structure for a trolley.

2. Description of the Prior Art

A conventional trolley contains an inverted U-shaped frame, at least four rollers disposed on a bottom end of the inverted U-shaped frame, a loading plate mounted on a bottom end of the frame, wherein an angle between the loading plate and the frame is 90 degrees, such that objects are placed on the loading plate and contact with the frame so as to carry the objects after pushing the trolley. However, the objects are not fixed on the loading plate and drop from the trolley as pushing the trolley.

To solve such a problem, an elastic belt is connected on the trolley and has two hooks fixed on two sides of the elastic belt to fasten with two sides of the trolley, such that the elastic belt fastens the objects. However, the elastic belt is connected on the trolley by using the two hooks, and as the trolley does not carry the objects, the two hooks do not fasten with the two sides of the trolley, so the elastic belt will be lost easily. Likewise, the elastic belt causes an elasticity fatigue after a period of using time, so the objects cannot be fixed on the trolley by ways of the elastic belt.

The present invention has arisen to mitigate and/or obviate the afore-described disadvantages.

SUMMARY OF THE INVENTION

The primary objective of the present invention is to provide a fastening belt structure for a trolley which contains a first body, a second body, and a third body; wherein the first body includes a female buckle disposed on a first end thereof and its second end mounted on a support post of a first side of the trolley; the second body includes a male buckle fixed on a first end thereof and an engagement unit secured on a second end thereof; the third body includes a first end coupled with a support post of a second side of the trolley, and the third body also includes a second end inserted through the engagement unit, and the second end of the third body is a tail segment; and the engagement unit includes a connection portion for connecting with the second body, a stopping plate secured therein, a first recess and a second recess which are configured to insert the third body, and an engaging plate rotatably coupled with the second recess.

Accordingly, the fastening belt structure of the present invention has advantages as follows:

1. The fastening belt structure contains the first body, the second body, the third body, the female buckle, the male buckle, and the engagement unit, such that the third body is adapted to roll and bind the objects fixedly and easily on the trolley.

2. When the fastening belt is not used, the third body is pulled tightly and is rolled on the trolley directly to obtain using convenience as desiring to tie the objects on the trolley.

3. The third body further includes the retainer arranged on the tail segment thereof, the retainer retains on the middle section of the third body, thus fixing the third body on the trolley easily and securely by using the retainer to prolong its service life.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
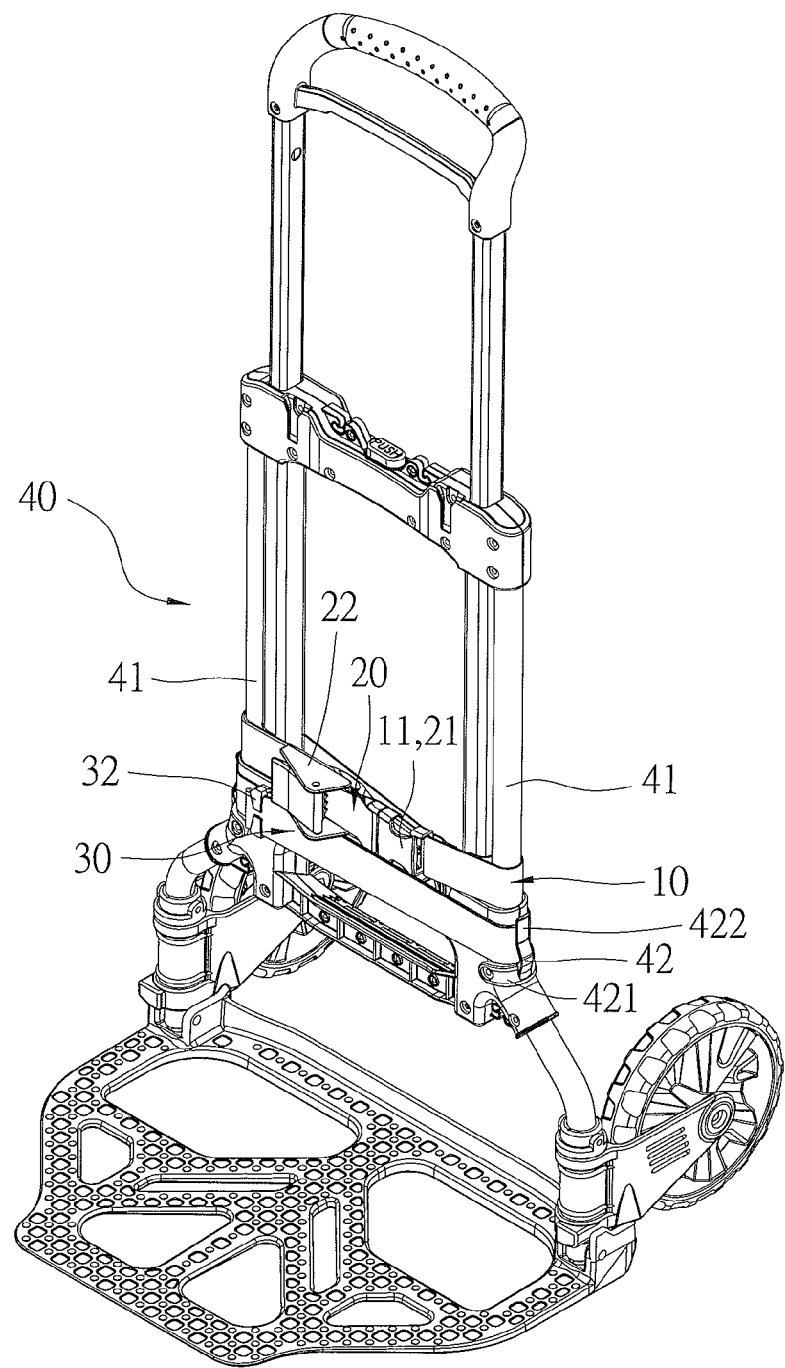
FIG. 1 is a perspective view showing the assembly of a fastening belt structure for a trolley in accordance with a preferred embodiment of the present invention.
Figure 2:
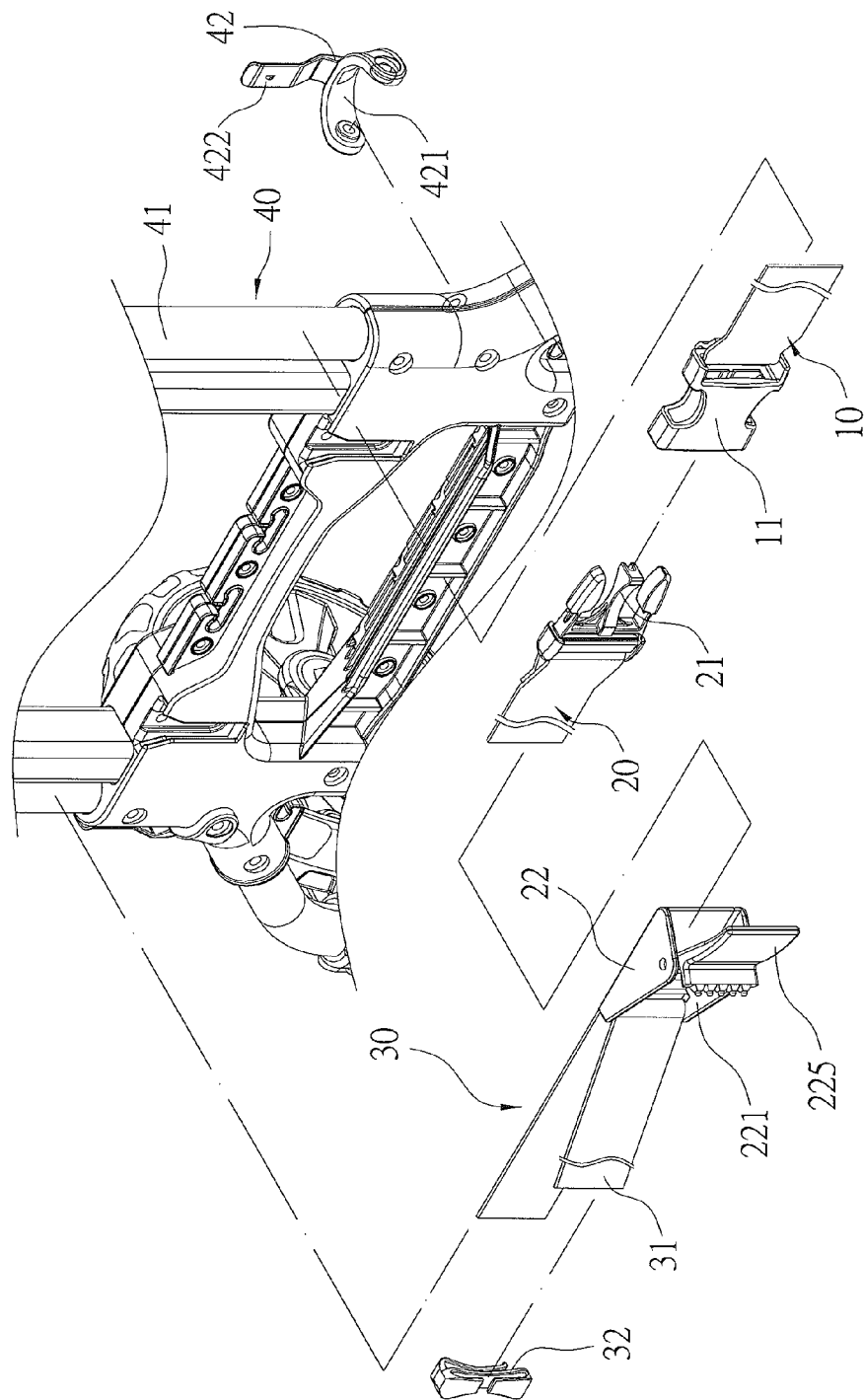
FIG. 2 is a perspective view showing the exploded components of a part of the fastening belt structure for the trolley in accordance with the preferred embodiment of the present invention.
Figure 3:
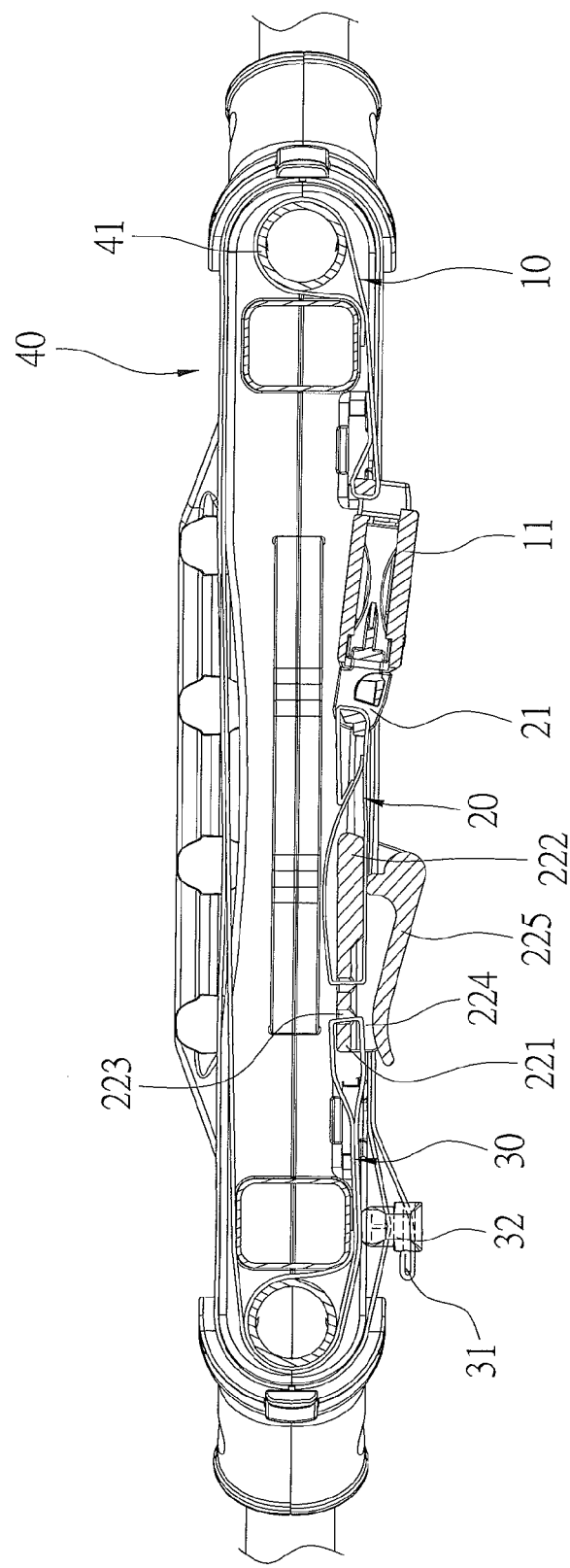
FIG. 3 is a cross sectional view showing the assembly of a part of the fastening belt structure for the trolley in accordance with the preferred embodiment of the present invention.

Referring to FIGS. 1 to 3, a fastening belt structure for a trolley according to a preferred embodiment of the present invention comprises: a first body 10, a second body 20, and a third body 30. The first body 10 includes a female buckle 11 disposed on a first end thereof and its second end mounted on a support post 41 of a first side of the trolley 40. The second body 20 includes a male buckle 21 fixed on a first end thereof and an engagement unit 22 secured on a second end thereof. The third body 30 includes a first end coupled with a support post 41 of a second side of the trolley 40, and the third body 30 also includes a second end inserted through the engagement unit 22, wherein the second end of the third body 30 is a tail segment 31. The third body 30 further includes a retainer 32 arranged on an edge of the tail segment 31. The engagement unit 22 includes a connection portion 221 for connecting with the second body 20, a stopping plate 222 secured therein, a first recess 223 and a second recess 224 which are configured to insert the third body 30, and an engaging plate 225 rotatably coupled with the second recess 224.

In assembly, as shown in FIGS. 1 to 3, the female buckle 11 of the first body 10 is disposed on the support post 41 of the first side of the trolley 40, the first end of the third body 30 is coupled with the support post 41 of the second side of the trolley 40, and the tail segment 31 is pulled out of the second recess 224 from the first recess 223 of the engagement unit 22 via the stopping plate 222 to be engaged by the engagement unit 22, the male buckle 21 is connected with the connection portion 221 of the engagement unit 22 through the second body 20, such that the male buckle 21 is fixed on the trolley 40, and the female buckle 11 fastens with the male buckle 21. Furthermore, the trolley 40 further comprises two fastening members 42 fixed on the first side and the second side of the trolley 40, and each fastening member 42 has a first locking piece 421 for fixing each fastening member 42 on the trolley 40 and has a second locking piece 422 for joining with the third body 30, thus assembling the fastening belt structure completely.

Figure 4:
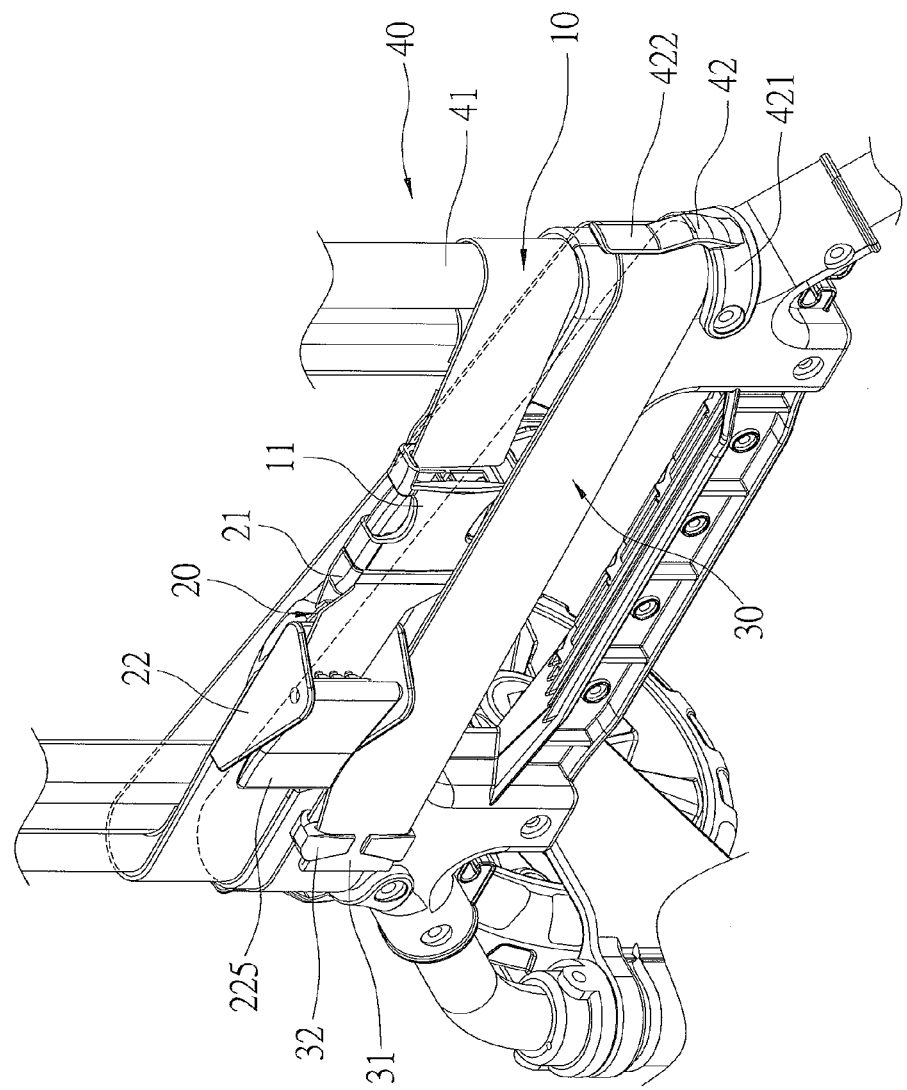
FIG. 4 is a perspective view showing the application of a part of the fastening belt structure for the trolley in accordance with the preferred embodiment of the present invention.

As illustrated in FIGS. 3 and 4, when a fastening belt of the trolley 40 is not used, the female buckle 11 fastens with the male buckle 21, the third body 30 is releases by using the engagement unit 22, and the trolley 40 is pulled and bound tightly, such that the third body 30 is pulled out of the engagement unit 22 and then is rolled on the trolley 40. In the meantime time, the two fastening members 42 on the first side and the second side of the trolley 40 fix the third body 30. For example, the third body 30 is clamped by two locking pieces 422 of the two fastening members 42, and because the third body 30 further includes the retainer 32 arranged on the tail segment 31 thereof, the retainer 32 retains with the tail segment 31 and a middle section of the third body 30 together, thus fixing the third body 30 on the trolley 40 easily and securely.

Figure 5:
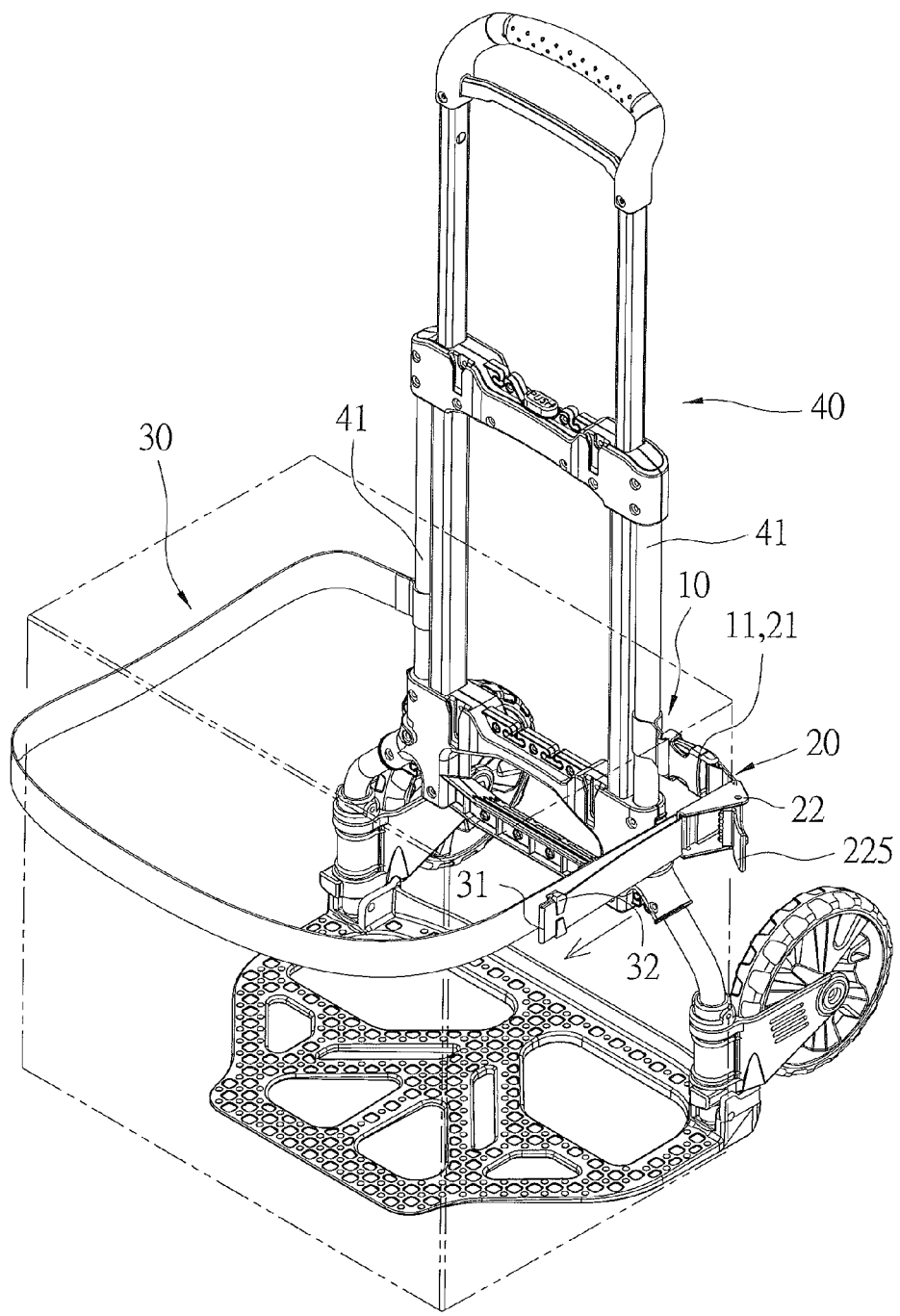
FIG. 5 is a perspective view showing the application of the fastening belt structure for the trolley in accordance with the preferred embodiment of the present invention.
Figure 6:
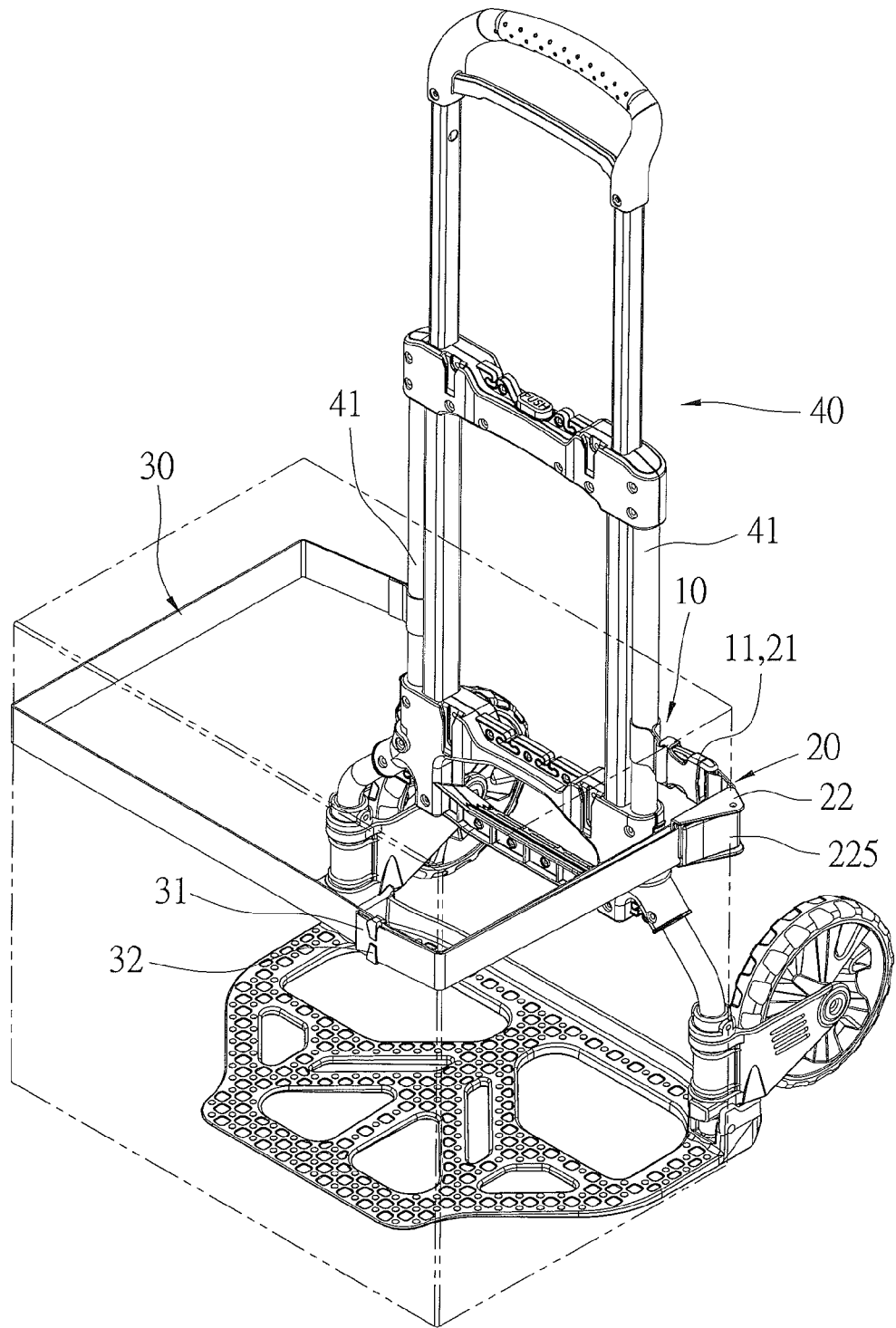
FIG. 6 is another perspective view showing the application of the fastening belt structure for the trolley in accordance with the preferred embodiment of the present invention.

When the trolley 40 carries objects, the fastening belt ties the objects tightly. As illustrated in FIGS. 5 and 6, the engaging plate 225 of the engagement unit 22 is released so as to pull the third body 30 for rolling the objects, and the tail segment 31 of the third body 30 is pulled tightly, the engaging plate 225 is rotated to retain the third body 30 with the stopping plate 222, thus fastening the objects by ways of the third body 30. Thereafter, the engagement unit 22 limits a tightness of the third body 30, and the retainer 32 retains with the tail segment 31 and the middle section of the third body 30 together, thus fixing the third body 30 on the trolley 40 securely.

Figure 7:
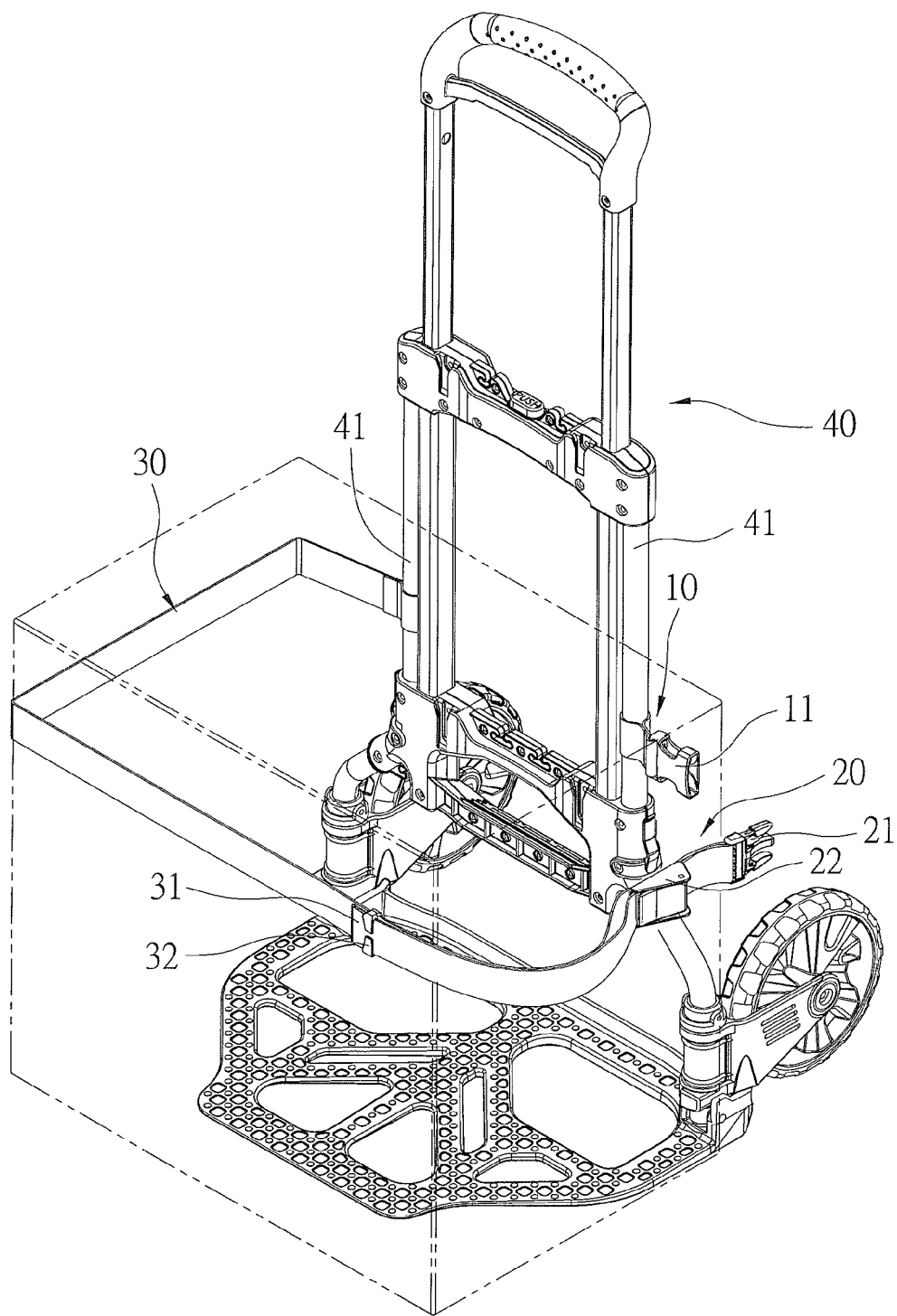
FIG. 7 is also another perspective view showing the application of the fastening belt structure for the trolley in accordance with the preferred embodiment of the present invention.

As unloading the objects from the trolley 40, the female buckle 11 is unfastened from the male buckle 21, as shown in FIG. 7, and the third body 30 is removed from the support post 41 of the second side of the trolley 40, thus discharging the objects from the trolley 40.

Accordingly, the fastening belt structure of the present invention has advantages as follows:

1. The fastening belt structure contains the first body 10, the second body 20, the third body 30, the female buckle 11, the male buckle 21, and the engagement unit 22, such that the third body 30 is adapted to roll and bind the objects fixedly and easily on the trolley 40.

2. When the fastening belt is not used, the third body 30 is pulled tightly and is rolled on the trolley 40 directly to obtain using convenience as desiring to tie the objects on the trolley 40.

3. The third body 30 further includes the retainer 32 arranged on the tail segment 31 thereof, the retainer 32 retains on the middle section of the third body 30, thus fixing the third body 30 on the trolley 40 easily and securely by using the retainer 32 to prolong its service life.

While we have shown and described various embodiments in accordance with the present invention, it is clear to those skilled in the art that further embodiments may be made without departing from the scope of the present invention.

What is claimed is:

1. A fastening belt structure for a trolley comprising:
a first body including a female buckle disposed on a first end thereof and a second end mounted on a support post of a first side of the trolley;
a second body including a male buckle fixed on a first end thereof and an engagement unit secured on a second end thereof;
a third body including a first end coupled with a support post of a second side of the trolley, and the third body also including a second end inserted through the engagement unit, and the second end of the third body being a tail segment; and
the engagement unit including a connection portion for connecting with the second body, a stopping plate secured therein, a first recess and a second recess which are configured to insert the third body, and an engaging plate rotatably coupled with the second recess.

2. The fastening belt structure for the trolley as claimed in claim 1, wherein the third body further includes a retainer arranged on the tail segment thereof, the retainer retains on a middle section of the third body.

3. The fastening belt structure for the trolley as claimed in claim 1, wherein the trolley further comprises two fastening members fixed on the first side and the second side of the trolley, and each fastening member has a first locking piece for fixing each fastening member on the trolley and has a second locking piece for joining with the third body.

* * * * *